Figure 1:
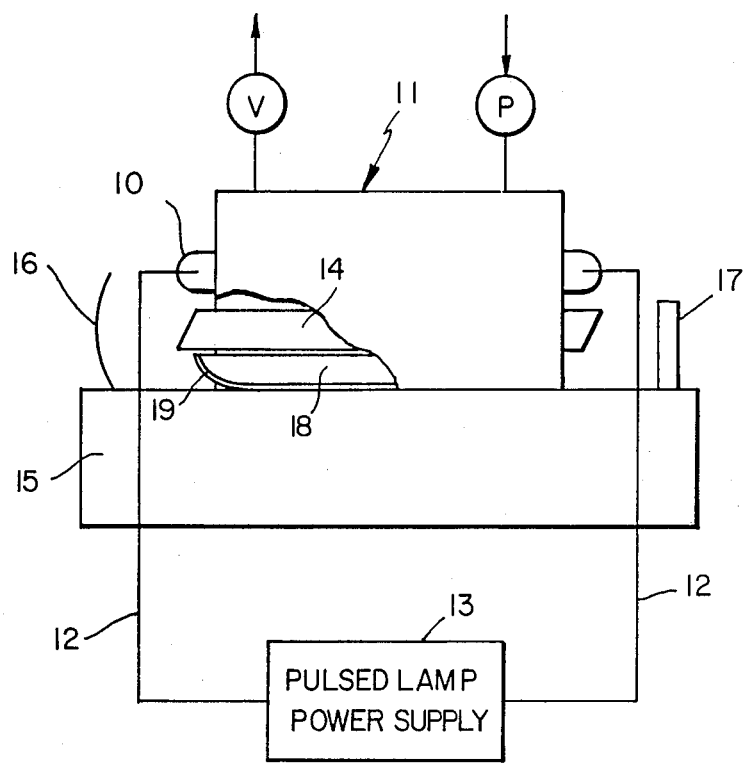

United States Patent [19]

Dubé

[11] Patent Number: 4,769,823
[45] Date of Patent: Sep. 6, 1988

[54] LASER SYSTEM WITH TRIVALENT CHROMIUM DOPED ALUMINUM TUNGSTATE FLUORESCENT CONVERTER

[75] Inventor: George Dubé, Dalton, Pa.

[73] Assignee: General Electric Company, Binghamton, N.Y.

[21] Appl. No.: 815,248

[22] Filed: Dec. 31, 1985

[51] Int. Cl.⁴ ............................................. H01S 3/091
[52] U.S. Cl. ......................................... 372/70; 372/80
[58] Field of Search ..................... 372/70, 39, 40, 41, 372/80; 252/301.16, 301.18

[56] References Cited

U.S. PATENT DOCUMENTS

| | | | |
|---|---|---|---|
| 3,338,841 | 8/1967 | Brixner | 372/41 |
| 4,044,315 | 8/1977 | Snitzer | 372/40 |
| 4,412,332 | 10/1983 | Knights et al. | 372/80 X |
| 4,445,217 | 4/1984 | Acharekar et al. | 372/40 |

OTHER PUBLICATIONS

Pekermann et al., "Broad Band . . . Tungstates", Proceedings of the 1984 International Conference on Luminescene, Aug. 13-17, 1984, pp. 71-77.

Primary Examiner—Eugene R. LaRoche
Assistant Examiner—Seung Ham
Attorney, Agent, or Firm—I. David Blumenfeld

[57] ABSTRACT

The invention relates to a flash lamp pumped neodymium laser incorporating a fluorescent converter material which significantly improves the pumping efficiency of the neodymium laser. The fluorescent converter material is aluminum tungstate doped with trivalent chromium ions. The doped material combines broad absorption bands, short fluorescence decay times, and high quantum efficiency and emission in the region which is efficiently absorbed by neodymium.

3 Claims, 1 Drawing Sheet

LASER SYSTEM WITH TRIVALENT CHROMIUM DOPED ALUMINUM TUNGSTATE FLUORESCENT CONVERTER

BACKGROUND OF INVENTION

This invention relates to the neodymium laser incorporating a fluroescent converter and, more particularly, one which incorporates a dopant material which substantially enhances the spectral conversion efficiency of the fluorescent converter.

The use of fluorescent converters to increase the pumping efficiency of flash lamp pumped neodymium lasers has been suggested in the past. However, it has proved to be extremely difficult to find fluorescent converter materials which meet all of the necessary requirements for an effective converter; viz, high quantum efficiency, a very short (less than 20 microseconds) fluorescence decay time, spectral emission in the 740 to 900 nanometer region which is efficiently absorbed by neodymium and adequate reliability and durability.

Applicant however, has found, that chromium doped aluminum tungstate is extremely effective as a fluorescent converter material for enhancing the pumping efficiency of a flash lamp pumped neodymium laser. Chromium doped aluminum tungstate fluorescent converters have high quantum efficiencies; [i.e., conversions greater than 90 percent] and short fluorescence decay times—with a decay constant [1/e] of approximately sixteen (16) microseconds which make them extremely effective converters.

It is interesting to note that attempts in the past to utilize chromium doped aluminum tungstate as a laser material ended in disappointment because the material had short decay time; i.e., the emission decayed too rapidly.

The very characteristic that made chromium doped aluminum tungate undesirable as a laser material was found by applicant to be helpful in its use as a fluorescent converter in a laser system.

It is therefore a principal objective of the instant invention to provide a neodynium laser system utilizing chromium doped aluminum tungstate fluorescent converter material.

Another objective of the invention is to utilize chromium doped aluminum tungstate for converting flash lamp light outside of the neodynium pumping band wave lengths to wave lengths absorbed by the laser.

Other objectives and advantages of the instant invention will become apparent as the description of the invention proceeds.

SUMMARY OF THE INVENTION

In the invention a flash lamp pumped neodymium laser system incorporates a fluorescent converter having chromium doped aluminum tungstate as the converter material. The concentration of the chromium ions in the tungstate should be in the range of 0.05 to 3 mole percent. Light emitted by the flash lamp falling outside of laser pumping the bands is converted into spectral emissions in the 750–800 nanometer wave lengths which are efficiently absorbed by the neodymium ions in the laser material. As a result, the laser system efficiency is increased by as much as 30%

The novel features and characteristics of this invention are set forth with particularity in the appended claims. The invention itself, however, both as to its organization and mode of operation, together with further objectives and advantages thereof, may best be understood by reference to the following description taken in connection with the accompanying drawings in which:

The FIG. 1 is a schematic illustration of a flash pumped laser which incorporates a fluorescent converter assembly.

Referring now to the FIG. 1, the present invention is illustrated in a laser system having a flash lamp 10, mounted in a housing 11. Lamp 10 is a xenon gas filled lamp which has its electrodes connected by electrical leads 12 to a pulsed power supply 13 which supplies power to the lamp. The lamp produces light flashes which are directed towards a laser element 14. The laser is mounted on an optical bed 15 which might have a mirrored surface 16 at one end and a partially mirrored surface 17 at the other to form the lasing cavity with the light from the laser entering and exiting from the ends thereof through a suitable Brewster angle surface. Positioned between the laser slab or rod and the optical bed is a fluorescent converter 18 consisting of a $C_r^{+3}$ doped aluminum tungstate crystal having a metallic reflective (preferably silvered) surface 19. The tungstate matrix is doped with trivalent, $C_r^{+3}$, chromium ions. The $C_r^{+3}$: $Al_2(WO_4)_3$ has a doping concentration of trivalent chromium ions in a range of 0.05 to 3 mole percent and preferably one (1) mole percent. With higher concentrations of the chromium ions the aluminum tungstate crystal may be darkened resulting in light absorption in the crystal and a resultant loss of efficiency. The trivalent chromium atoms are implanted in the aluminum tungstate matrix by a variety of processes. One process is a flux method from Na, W, O flux with the addition of the trivalent chromium ions in a concentration of one (1) mole percent. The steps of this method are described in detail in each of the following publications.

V. I. Vononka, V. K. Yanovsky and V. A. Kopsik, Vest. Mosk Gos. Univ., Fiz., Astron, P. 109 (1968). V. K. and V. I. Voronkova, Journal of Crystal Growth 52, p. 654–659 (1981).

Cooling Fluid from a reservoir, not shown, is circulated through the housing and past the laser, lamp and converter by means of a pump 20. The cooling fluid is recirculated to the reservoir through the valve and conduit 21.

The spectral characteristics of the chromium doped aluminum tungstate is such that it absorbs that light in the 300–740 nanometer band which falls outside of the laser "pumping" bands and re-emits it in 750 and 800 nanometers laser "pumping" bands. The chromium doped aluminum tungstate has extremely high quantum efficiency; i.e., the chromium doped aluminum tungstate converts more than 90% of the light into the desired "pumping" band at which light is efficiently absorbed by the neodymium ions in the laser material.

It will be understood that an index matching fluid is positioned between the fluorescent converter material 18 and the neodymium doped laser material 14, to match the optical indices of the two elements and more efficiently transport the fluorescense emission from the converter to the neodymium ions.

The chromium doped aluminum tungstate converter was tested by producing a small crystal having a chromium doping concentration of approximately one (1) mole percent by weight. In practice, one surface of the fluorescent converter would be covered with a silvered reflecting layer for reflecting as light from the flash lamp as well as fluorescent emissions from the converter material back to the laser element. The converter was subjected to laser light in the 633 nanometer band, a light band which falls outside of the bands which are normally absorbed by the neodymium ions to produce a lasing. The fluorescent converter material was monitored and found to emit light in the 850 nanometer band; i.e., a band efficiently absorbed by the neodymium ions.

It is therefore obvious that aluminum tungstate doped with trivalent chromium is an extremely effective fluorescent converter material and results in improvements in the neodymium laser pumping efficiencies in a flash lamp pumped neodymium laser.

While the instant invention has been described in connection with preferred embodiments thereof, the invention is by no means limited thereto since other modifications of the instrumentalities employed may be made and still fall within the scope of the invention. It is contemplated by the 53 ended claims to cover any such modifications that fall with the true scope and spirit of this invention.

What I claim as new and desire to secure by Letters Patent of the United States is:

1. In a laser system the combination comprising:
   (a) a neodymium element;
   (b) a light source for pumping said neodymium laser element to produce coherent, monochromatic light;
   (c) a fluorescent converter element positioned in light exchange relationship with said light source for spectrally shifting at least a portion of light outside of the neodymium laser pumping band passing through the neodymium laser into light in the neodymium laser pumping band;
   (d) said fluorescent element including trivalent chromium doped aluminum tungstate excited by light passing through said laser which is outside of the pumping band for said laser, said tungstate converting a portion of light passing through said laser element which is outside of the pumping band into light within the pumping band;
   (e) the concentration of the trivalent chromium dopant lying in the range of 0.5 to 3 per mole percent (%).

2. In a laser system the combination comprising:
   (a) a neodymium laser element;
   (b) a light source for pumping said neodymium laser element to produce coherent, monochromatic light; positioned on one side of said laser element;
   (c) a solid state fluorescent converter element containing trivalent chromium doped aluminum tungsten positioned on the other side of said laser element, said converter absorbing light from said light source which falls outside of the laser pumping band and which passes through said laser, said converter spectrally shifting at least a portion of the light passing through said laser into light in the neodymium laser pumping band and means for reflecting said spectrally shifted light back to said laser element;
   (d) the concentration of the trivalent chromium dopant lying in the range of 0.5 to 3 mole percent (%).

3. The laser system according to claim 2 wherein the side of the solid fluorescent converter positioned away from said laser element as a reflective surface.

* * * * *